(12) United States Patent
Hofer

(10) Patent No.: US 6,383,109 B1
(45) Date of Patent: May 7, 2002

(54) DRIVE MECHANISM FOR DRIVING A FOUR WHEEL DRIVE VEHICLE WITH SPEED-DIFFERENCE-DEPENDENT HYDRAULIC CLUTCH

(75) Inventor: Manfred Hofer, Graz (AT)

(73) Assignee: Steyr Daimler Puch Fahrzeugtechnik AG & CO KG, Graz (AT)

( * ) Notice: Subject to any disclaimer, the term of this patent is extended or adjusted under 35 U.S.C. 154(b) by 0 days.

(21) Appl. No.: 09/600,545
(22) PCT Filed: Nov. 22, 1999
(86) PCT No.: PCT/AT99/00283
  § 371 Date: Sep. 5, 2000
  § 102(e) Date: Sep. 5, 2000
(87) PCT Pub. No.: WO00/30884
  PCT Pub. Date: Jun. 2, 2000

(30) Foreign Application Priority Data

Nov. 20, 1998 (AT) ............................................. 779/98 U

(51) Int. Cl.$^7$ ............................................. F16H 48/30
(52) U.S. Cl. ......................................................... 475/88
(58) Field of Search ............................... 475/84, 86, 88, 475/118; 192/103 R, 85 AA

(56) References Cited

U.S. PATENT DOCUMENTS

| | | | | |
|---|---|---|---|---|
| 3,109,323 A | * | 11/1963 | Saurer ......................... | 475/88 |
| 3,724,289 A | * | 4/1973 | Kennicutt ..................... | 475/88 |
| RE34,209 E | * | 3/1993 | McGarraugh ............. | 475/84 X |
| 5,360,091 A | * | 11/1994 | Sommer ............. | 192/103 R X |
| 5,536,215 A | | 7/1996 | Shaffer et al. | |
| 5,595,214 A | | 1/1997 | Shaffer et al. | |
| 5,735,764 A | | 4/1998 | Schaffer et al. | |
| 5,888,163 A | | 3/1999 | Shaffer et al. | |
| 5,941,788 A | | 8/1999 | Shaffer et al. | |
| 6,095,939 A | * | 8/2000 | Burns et al. ................... | 475/88 |
| 6,186,258 B1 | * | 2/2001 | Deutschel et al. ... | 192/103 F X |

FOREIGN PATENT DOCUMENTS

| | | | | |
|---|---|---|---|---|
| JP | 6182048 | * | 4/1986 | ................... 475/88 |
| JP | 62209249 | * | 9/1987 | ................... 475/86 |
| JP | 4366047 | * | 12/1992 | ................... 475/86 |

\* cited by examiner

*Primary Examiner*—Rodney H. Bonck
*Assistant Examiner*—Roger Pang
(74) *Attorney, Agent, or Firm*—Bachman & LaPointe, P.C.

(57) ABSTRACT

A drive unit for driving the second driven axle of an all-wheel drive vehicle with a hydraulic coupling dependent on rotational-speed differences, comprising a driven case and two half shafts, which can each be connected to the latter by a friction clutch, the friction clutches being operatively connected to a hydraulic positive displacement machine that operates when a rotational-speed difference occurs between the case and the half shaft. To achieve optimum torque distribution combined with inexpensive and small construction, the half shafts are connected to one another by a three-member averaging transmission, of which the first and the second member are each connected in terms of drive to one half shaft and the third member rotates at a rotational speed which is the average of the rotational speeds of the first and the second member, and a single hydraulic positive displacement machine is provided, the first rotor of which is connected in terms of drive to the third member of the averaging transmission and which is operatively connected to both friction clutches.

3 Claims, 2 Drawing Sheets

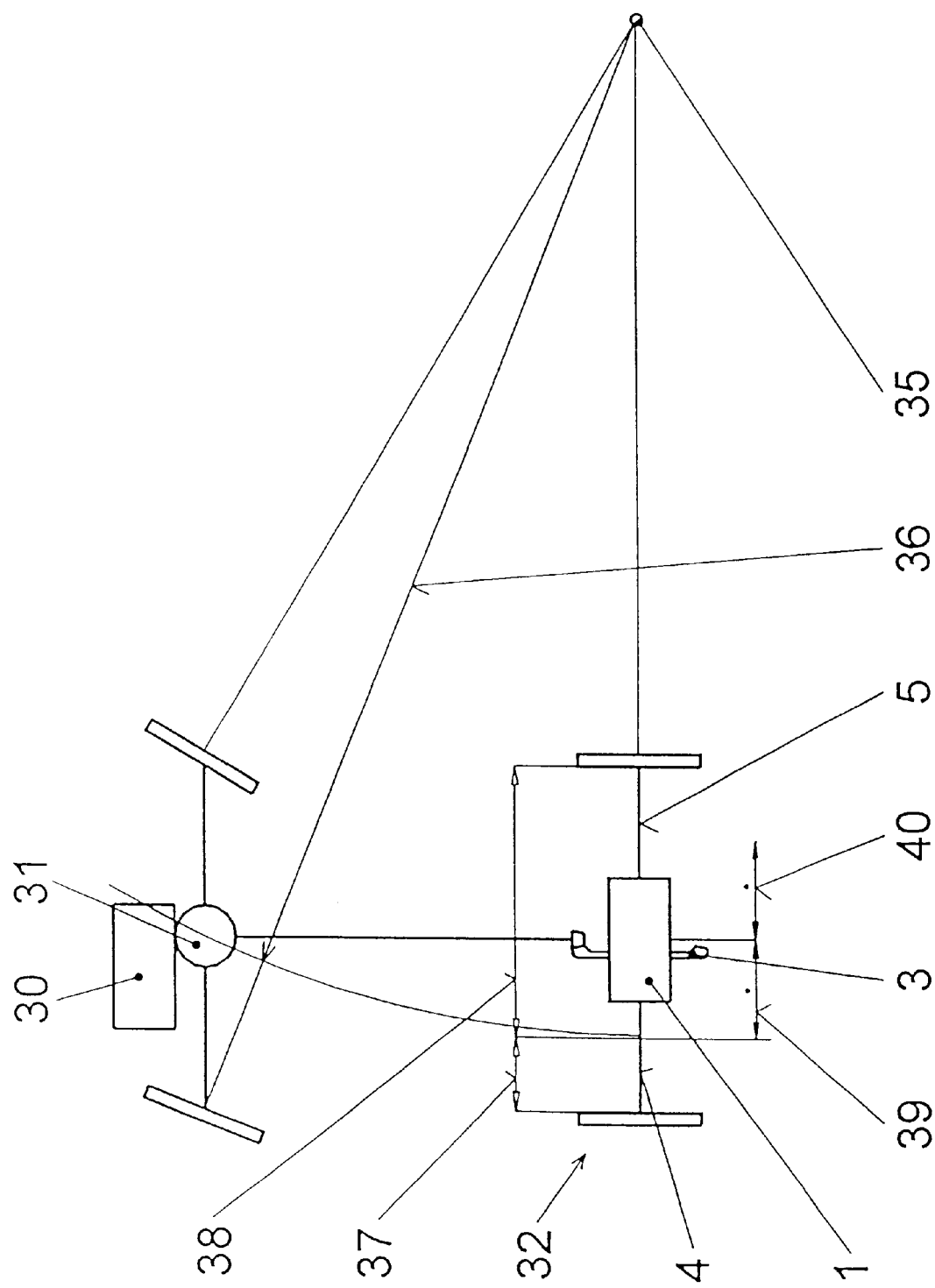

Figure 1:
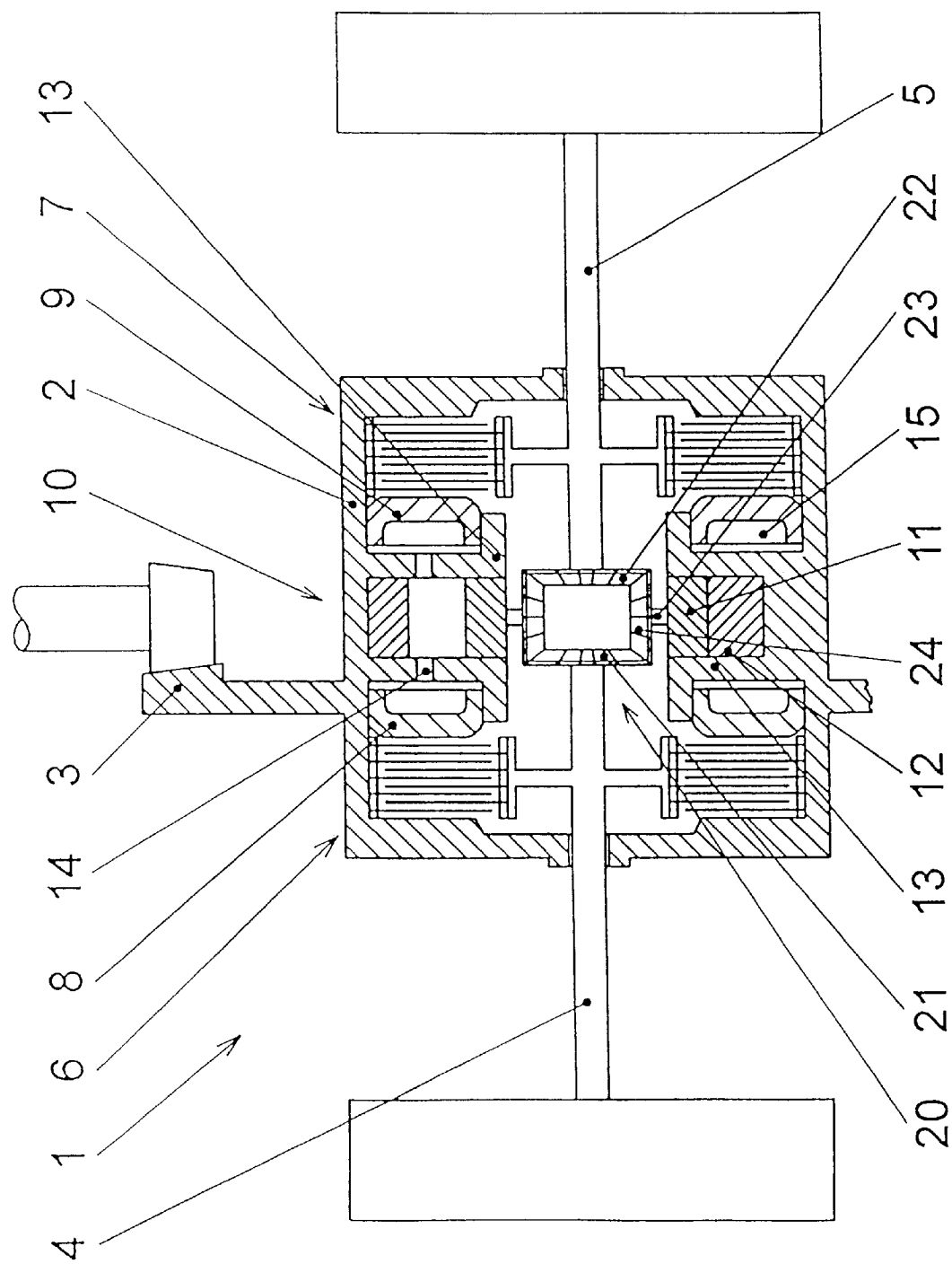

DRIVE MECHANISM FOR DRIVING A FOUR WHEEL DRIVE VEHICLE WITH SPEED-DIFFERENCE-DEPENDENT HYDRAULIC CLUTCH

The invention relates to a drive unit for driving the second driven axle of an all-wheel drive vehicle with a hydraulic coupling dependant on rotational-speed differences, comprising a driven case and two half shafts, which can each be connected to the latter by a friction clutch, the friction clutch being operatively connected to a hydraulic positive displacement machine that operates when a rotational-speed difference occurs between the case and the half shaft and has a first and a second rotor which can rotate in a case.

A coupling of this kind is known from WO Preliminary Published Application 95/23931, FIG. 14. In this, two mutually independent friction clutches are each provided in the case between a half shaft and the case and are each operatively connected to their own hydraulic positive displacement machine. The first rotor of one machine is connected to one half shaft for rotation in common, while the first rotor of the second machine is connected to the other half shaft. As a result, the torque transmitted to one half shaft rises with the rotational-speed difference between the respective half shaft and the case.

First of all, this has the disadvantage that the torque at the half shaft on the inside of the bend when cornering rises more sharply than that at the outside of the bend. However, this represents very unfavorable torque distribution and leads to stressing of the driveline, with higher wear on the tires and steering as a result.

The presence of two hydraulic positive displacement machines, which are never completely identical as regards characteristics and play (top and side gaps of the rotors) and diverge even more over their life due to differences in wear leads to uneven torque distribution, even during straight-ahead travel, to higher wear and disturbance to straight-line running. Moreover, the two hydraulic positive displacement machines are expensive to manufacture and take up a lot of installation space, which is very short between the half shafts, which should be as long as possible.

It is therefore the aim of the invention to propose a drive unit of the generic type which avoids these disadvantages; that is to say one which offers optimum torque distribution in combination with an inexpensive and small design. According to the invention, this is achieved by virtue of the fact that a) the half shafts are connected to one another by a three-member averaging transmission, of which the first and the second member are each connected in terms of drive to one half shaft and the third member rotates at a rotational speed which is the average of the rotational speeds of the first and the second member, b) a single hydraulic positive displacement machine is provided, the first rotor of which is connected in terms of drive to the third member of the averaging transmission and which is operatively connected to both friction clutches.

Thus only one hydraulic positive displacement machine is provided, and this is driven with the average of the rotational speeds of the two half shafts. As a result, both half shafts transmit approximately the same torque during cornering, and during straight-ahead travel the torque transmitted is not dependent on differences between two positive displacement machines. Both of these factors lead to lower wear and operation which is largely free of stress. Eliminating one positive displacement machine reduces the price and the space requirement of the unit, or one positive displacement machine can be given larger dimensions for a higher pump pressure, so that the friction clutches need fewer clutch plates.

In a preferred embodiment, the hydraulic positive displacement machine is arranged between the two friction clutches. This means that the connecting paths to both pistons acting on the friction clutches are equally short and, overall, that the case is very simple with many instances of symmetry and identical components.

There are a number of different options available for the averaging transmission (e.g. planetary transmission). It is preferably a bevel-gear differential, the differential gears of which are rotatably mounted in the third member. Its installation dimensions are then very small both in the axial and in the radial direction, especially since, of course, only the torque required to drive the positive displacement machine has to be transmitted, not the drive torque. At the same time, there is very wide latitude in the relative arrangement of the positive displacement machine and the averaging transmission.

The invention will be described and explained in the following text by means of figures, of which:

FIG. 1: shows a preferred embodiment of the invention in schematic form, and

FIG. 2: shows a schematic diagram of a drive line intended to illustrate its action.

In FIG. 1, the drive unit 1 is illustrated in simplified form. A case 2 is surrounded by a crown wheel 3, which is connected firmly to or is integral with the latter. Projecting out of the case 2 are a left-hand half shaft 4 and a right-hand half shaft 5, which can be connected to the case 2 by means of a left-hand and a right-hand friction clutch 6, 7 respectively. For this purpose, the outer plates of the friction clutches are connected to the case 2 in a manner which prevents relative rotation but allows displacement, while the inner plates are connected to the left-hand and right-hand half shaft 4, 5 respectively. The plates are pressed together by a left-hand and a right-hand piston 8, 9 to produce the frictional connection. Arranged between the two pistons is a positive displacement machine denoted overall by 10. It comprises an inner rotor 11, an outer rotor 12, which is guided eccentrically and in a freely rotatable manner between two side walls 13. Provided on both sides in the side walls 13 are passages 14, which lead to the pressure chambers 15 behind the pistons 8, 9.

The two half shafts 4, 5 are connected to one another by an averaging transmission 20. The averaging transmission comprises a left-hand axle bevel gear 21 (first member), a right-hand bevel differential gear 22 (second member) and a third member 23, in which differential bevel gears 24 are rotatably mounted. This third member 23 is connected to the inner rotor 11 of the hydraulic positive displacement machine 10 for rotation in common. The rotational speed of the third member is the average of the rotational speeds of the first and second members, with the result that the inner rotor 11 rotates at the average rotational speed. The averaging transmission is of relatively small size since it has only to be configured for the torque necessary to drive the positive displacement machine and not for the drive torque of the vehicle. The hydraulic positive displacement machine can take a very wide variety of different forms, particularly as regards the shape of its toothing.

The operation of the drive unit 1 will now be explained with reference to FIG. 2. The drive line of an all-wheel drive vehicle begins with the engine/gearbox block 30 and the adjoining front-axle differential 31 with an output for the rear axle 32, which includes the drive unit 1 according to the invention. The vehicle is traveling round a bend, the center of the turning circle being denoted by 35 and the central cornering radius of the wheels of the front axle being denoted by 36. This corresponds to the average of the rotational speeds of the two front wheels and hence also to the rotational speed at which the crown wheel 3 of the drive unit 1 of the rear axle is being driven.

When using a prior-art drive unit with two positive displacement machines, each of which is assigned to one of the two half shafts, the rotational speed difference at the respective positive displacement machine is proportional to the differences in travel and hence proportional to the distance 37 for the left-hand rear wheel and proportional to the distance 38 for the right-hand wheel, which is on the inside of the bend. Since the torques transmitted are approximately proportional to the rotational-speed difference, this means that significantly less torque is transmitted at the left-hand rear wheel than at the right-hand rear wheel on the inside of the bend.

By virtue of the drive unit 1 according to the invention with a single positive displacement machine, the pressure of which is determined by the difference between the rotational speed of the case 2 and the average of the rotational speeds of the half shafts 4, 5, the torque is transmitted to the two rear wheels in proportion to the distances 39 and 40, i.e. uniformly. The yawing moment of the vehicle caused by the wheel torque at the rear wheels on the inside and outside of the bend respectively is thus less than when using two positive displacement machines. As a result, there is less stress on the drive line during cornering.

What is claimed is:

1. A drive unit for driving a second driven axle of an all-wheel drive vehicle with a hydraulic coupling, comprising a driven case and two half shafts, which can each be connected to the driven case by a friction clutch, the friction clutch being operatively connected to a hydraulic positive displacement machine that operates when a rotational-speed difference occurs between the case and the half shaft, the positive displacement machine has a first and a second rotor which can rotate in a case, wherein a) the half shafts are connected to one another by a three-member averaging transmission comprising a first and a second member each drivingly connected to one half shaft and a third member which rotates at a rotational speed which is the average of the rotational speeds of the first and the second member, b) the first rotor of the hydraulic positive displacement machine is drivingly connected to the third member of the averaging transmission and which is operatively connected to both friction clutches.

2. A hydraulic coupling as claimed in claim 1, wherein the hydraulic positive displacement machine is arranged between the two friction clutches.

3. The hydraulic coupling as claimed in claim 1, wherein the averaging transmission is a bevel-gear differential, the differential gears of which are rotatably mounted in the third member.

* * * * *